United States Patent
Iwami et al.

(10) Patent No.: US 9,821,381 B2
(45) Date of Patent: Nov. 21, 2017

(54) GASEOUS FUEL SUPPLY APPARATUS FOR SINTERING MACHINE

(71) Applicant: JFE STEEL CORPORATION, Tokyo (JP)

(72) Inventors: Yuji Iwami, Fukuyama (JP); Katsuhiro Iwasaki, Yokohama (JP); Koichi Nushiro, Chiba (JP)

(73) Assignee: JFE STEEL CORPORATION, Tokyo (JP)

( * ) Notice: Subject to any disclaimer, the term of this patent is extended or adjusted under 35 U.S.C. 154(b) by 389 days.

(21) Appl. No.: 14/412,376

(22) PCT Filed: May 14, 2013

(86) PCT No.: PCT/JP2013/063354
§ 371 (c)(1),
(2) Date: Dec. 31, 2014

(87) PCT Pub. No.: WO2014/013776
PCT Pub. Date: Jan. 23, 2014

(65) Prior Publication Data
US 2015/0300631 A1    Oct. 22, 2015

(30) Foreign Application Priority Data
Jul. 18, 2012 (JP) .................................. 2012-159835

(51) Int. Cl.
F23C 5/02 (2006.01)
B23C 5/02 (2006.01)
(Continued)

(52) U.S. Cl.
CPC .................. *B23C 5/02* (2013.01); *C22B 1/20* (2013.01); *F27B 21/06* (2013.01)

(58) Field of Classification Search
CPC .... C22B 1/20; C22B 1/16; C22B 1/22; C22B 1/205; F23C 5/02; F27B 21/06; F27B 21/00
See application file for complete search history.

(56) References Cited

FOREIGN PATENT DOCUMENTS

EP    2 322 675 A1    5/2011
EP    2 365 101 A1    9/2011
(Continued)

OTHER PUBLICATIONS

Aug. 16, 2016 Office Action issued in Korean Patent Application No. 2015-7003660.
(Continued)

*Primary Examiner* — Alfred Basichas
(74) *Attorney, Agent, or Firm* — Oliff PLC

(57) ABSTRACT

Apparatus for supplying diluted gaseous fuel to not more than a lower limit combustion concentration at downstream of suction type sintering machine including a hood having similar width as a circularly-moving pallet and arranged above charged layer to surround the pallet in all directions, pipes disposed at upper position of charged layer in the hood and supplying the fuel air inside the hood, baffle plates formed by arranging plate materials having dog-leg shaped cross-section in plural rows and steps at intervals in the widthwise and height directions, respectively, of the hood to make each interval formed between adjacent plate materials in widthwise direction of the hood in each steps vertically alternate; fences having a void and arranged on both sides upper ends of the hood; vortex suppressing plates formed between fences at intervals having a void ratio, 20~80%; whereby the gaseous fuel leakage supplied to the outside is prevented.

8 Claims, 14 Drawing Sheets

(51) Int. Cl.
C22B 1/20 (2006.01)
F27B 21/06 (2006.01)

(56) References Cited

FOREIGN PATENT DOCUMENTS

| | | |
|---|---|---|
| EP | 2 371 975 A1 | 10/2011 |
| JP | S4627126 B | 8/1971 |
| JP | S4818102 A | 3/1973 |
| JP | S5518585 A | 2/1980 |
| JP | H05311257 A | 11/1993 |
| JP | 2008291354 A | 12/2008 |
| JP | 2008292153 A | 12/2008 |
| JP | 2010047801 A | 3/2010 |
| JP | 2010-078303 A | 4/2010 |
| JP | 2010107154 A | 5/2010 |
| JP | 2010-126802 A | 6/2010 |
| JP | 2011168826 A | 9/2011 |
| JP | 2011169570 A | 9/2011 |
| JP | 2011252665 A | 12/2011 |
| KR | 2011-0042353 A | 4/2011 |
| WO | 2007052776 A1 | 5/2007 |

OTHER PUBLICATIONS

Aug. 20, 2013 Search Report issued in International Application No. PCT/JP2013/063354.
Jul. 17, 2015 extended Search Report issued in European Patent Application No. 13819630.8.
Sep. 11, 2017 Office Action issued in Korean Application No. 10-2017-7018699.

GASEOUS FUEL SUPPLY APPARATUS FOR SINTERING MACHINE

TECHNICAL FIELD

This invention relates to a gaseous fuel supply apparatus for a downward suction type sintering machine producing a sintered ore by supplying and combusting a gaseous fuel as a part of sintering heat source.

BACKGROUND ART

In general, the sintered ore as a main raw material for a blast furnace iron-making method is manufactured through a process as shown in FIG. 1. The raw material for the sintered ore includes iron ore powder, undersize granules of the sintered ore, recovery powder produced in an ironworks, a CaO-containing auxiliary material such as limestone, dolomite or the like, a granulation auxiliary agent such as quicklime or the like, coke breeze, anthracite and so on, which are cut out from respective hoppers 1 onto a conveyer at a predetermined ratio. The cut-out raw material is added with a proper amount of water, mixed and granulated in drum mixers 2 and 3 to form quasi-particles having a mean particle size of 3~6 mm as a sintering raw material. Then, the sintering raw material is charged onto a pallet 8 of an endless-moving type sintering machine at a thickness of 400~800 mm from surge hoppers 4 and 5 disposed above the sintering machine through a drum feeder 6 and a cutout chute 7 to form a charged layer 9 also called as a sintering bed. Thereafter, carbonaceous material in a surface part of the charged layer is ignited by an ignition furnace 10 disposed above the charged layer 9, while air above the charged layer is sucked downward through wind boxes 11 located just beneath the pallet 8 to thereby combust the carbonaceous material in the charged layer, and the sintering raw material is melted by combustion heat generated at this time to obtain a sintered cake. The thus obtained sintered cake is then crushed and granulated, and agglomerates of not less than about 5 mm in size are collected as a product sintered ore and supplied into the blast furnace.

In the above manufacturing process, the carbonaceous material in the charged layer ignited by the ignition furnace 10 is continuously combusted by air sucked from the upper part of the charged layer toward the lower part thereof to form a combustion • molten zone having a certain width in a thickness direction (hereinafter referred to as "combustion zone" simply). FIG. 2 is a schematic view illustrating a process wherein the carbonaceous material in the surface part of the charged layer ignited by the ignition furnace is continuously combusted by sucked air to form the combustion zone, which is moved from the upper part of the charged layer to the lower part thereof sequentially to form the sintered cake. Also, FIG. 3(*a*) is a schematic view illustrating a temperature distribution when the combustion zone is existent in each of the upper part, middle part and lower part of the charged layer within a thick frame shown in FIG. 2.

The strength of the sintered ore is affected by a product of a temperature of not lower than 1200° C. and a time kept at this temperature. In order to manufacture a high-strength sintered ore in a short time and in a high yield with a good productivity, it is required to take some measures for prolonging the time kept at a high temperature of not lower than 1200° C. to increase the cold strength of the sintered ore. It is because a melt starts to be produced at 1200° C. to produce calcium ferrite having the highest strength and a relatively high reducibility among constitutional minerals of the sintered ore in the sintering process. However, the middle part and the lower part in the charged layer are pre-heated by combustion heat of the carbonaceous material in the upper part of the charged layer carried with the sucked air and kept at a high temperature for a long time, whereas the upper part of the charged layer is lacking in the combustion heat due to no preheating and hence combustion melting reaction required for sintering (sintering reaction) is liable to be insufficient. As a result, the yield of the sintered ore in the widthwise section of the charged layer becomes smaller at the upper part of the charged layer as shown in FIG. 3(*b*). Moreover, both widthwise end portions of the pallet are supercooled due to heat dissipation from the side walls of the pallet or a large amount of air passed, so that the time kept at a high temperature required for sintering cannot be secured sufficiently and the yield is also lowered.

As to these problems, it has hitherto been attempted to increase the amount of the carbonaceous material (coke breeze) added to the sintering raw material. However, it is possible to raise the temperature in the sintered layer and prolong the time kept at not lower than 1200° C. by increasing the addition amount of coke as shown in FIG. 4, while at the same time, the highest achieving temperature in the sintering exceeds 1400° C. and the decrease of the reducibility and cold strength of the sintered ore is caused. When the temperature exceeds the above temperature, calcium ferrite produced at a temperature of not lower than 1200° C. is decomposed into an amorphous silicate (calcium silicate) having the lowest cold strength and reducibility and a skeleton-crystal type secondary hematite easily causing reduction powdering, and hence the high-quality sintered ore cannot be obtained. To this end, it is necessary that the highest achieving temperature in the charged layer during sintering is not made to exceed 1400° C., preferably 1380° C., while the temperature in the charged layer is kept at not lower than 1200° C. (solidus temperature of calcium ferrite) for a long time. In the invention, the time kept in the temperature range of not lower than 1200° C. but not higher than 1400° C. is hereinafter called as "high-temperature zone retention time".

In order to address the problem, there are hitherto proposed some techniques for the purpose of keeping the upper part of the charged layer at a high temperature for a long time. For example, Patent Document 1 proposes a technique of injecting a gaseous fuel onto the charged layer after the ignition of the charged layer, and Patent Document 2 proposes a technique of adding a flammable gas to air sucked into the charged layer after the ignition of the charged layer, and Patent Document 3 proposes a technique wherein a hood is disposed above the charged layer for attaining a high temperature in the charged layer of the sintering raw material and a mixed gas of air and coke-oven gas is blown from the hood at a position just behind the ignition furnace, and Patent Document 4 proposes a technique of simultaneously blowing a low-melting point flux and a carbonaceous material or flammable gas at a position just behind the ignition furnace.

In these techniques, however, since a gaseous fuel with a high concentration is used and the amount of the carbonaceous material is not decreased in the blowing of the gaseous fuel, the highest achieving temperature in the charged layer during the sintering becomes high exceeding 1400° C. as an upper limit temperature under operation control, so that a sintered ore having a low reducibility or cold strength is formed, and hence the effect of supplying the gaseous fuel is not obtained, or the air permeability is deteriorated due to the temperature rising and thermal expansion by the combustion of the gaseous fuel to decrease the productivity, or further there is a risk of causing a fire accident in the upper space of the sintering bed (charged layer) by the supply of the gaseous fuel. As a result, any of these techniques are not brought into practical use.

As a technique for solving the above problems, the inventors have developed and proposed a technique wherein both of the highest achieving temperature and the high-temperature zone retention time in the charged layer are controlled within adequate ranges by decreasing the amount of the carbonaceous material added in the sintering raw material and introducing various gaseous fuels diluted to not more than the lower limit concentration of combustion into the charged layer from above the pallet in the downstream of the ignition furnace of the sintering machine to perform combustion in the charged layer in Patent Documents 5~7 and so on.

When the techniques disclosed in Patent Documents 5~7 are applied to the method of manufacturing the sintered ore and the gaseous fuel diluted to not higher than the lower limit concentration of combustion is introduced into the charged layer while decreasing the amount of the carbonaceous material added to the sintering raw material to combust the gaseous fuel in the charged layer, as shown in FIG. 5, the gaseous fuel is combusted in the charged layer (in the sintering layer) after the combustion of the carbonaceous material, so that the width of the combustion • molten zone can be enlarged in the thickness direction without exceeding the highest achieving temperature over 1400° C. and hence the high-temperature zone retention time can be prolonged effectively.

When sintering operation is conducted by supplying the gaseous fuel, however, it is feared that the gaseous fuel supplied is leaked out of the hood to cause a fire or an explosion in the case of a strong crosswind. It is also feared that the use of the blast furnace gas containing a large amount of CO or the like as the gaseous fuel may lead to a man-made disaster. Thus, the inventors have proposed a hood structure being little in the leakage due to crosswind in Patent Document 8, Patent Document 9 and so on.

FIG. 6 is a view illustrating an outline of a gaseous fuel supply apparatus proposed in Patent Document 9. The gaseous fuel supply apparatus 21 is comprised by arranging a plurality of gaseous fuel supply pipes 23 in parallel at a predetermined interval in the advancing direction of the pallet above a raw material charged layer 9 (sintering bed) and a hood 22 composed of a top-opened vertical wall around the gaseous fuel supply pipes 23. For example, a gaseous fuel such as LNG, town gas or the like is jetted from an injection port of each of the gaseous fuel supply pipes 23 toward a horizontal direction to both sides at a high speed. Above the gaseous fuel supply pipes 23 are arranged baffle plates 24 having a dog-leg shaped cross section in plural rows at intervals in the widthwise direction of the hood and in plural steps at intervals in the vertical direction in zigzag form. It is also disclosed that it is effective to arrange fences 25 having a certain void above the both sides of the hood 22 or provide seal covers 26 between the lower end portions of the both side surfaces of the hood 22 and the side walls of the pallet 8 as a countermeasure for the crosswind.

PRIOR ART DOCUMENTS

Patent Documents

Patent Document 1: JP-A-S48-018102
Patent Document 2: JP-B-S46-027126
Patent Document 3: JP-A-S55-018585
Patent Document 4 JP-A-H05-311257
Patent Document 5: WO2007-052776
Patent Document 6: JP-A-2010-047801
Patent Document 7: JP-A-2008-291354
Patent Document 8: JP-A-2008-292153
Patent Document 9: JP-A-2010-107154

SUMMARY OF THE INVENTION

Problem to be Solved by the Invention

As a result of the inventors' simulation, it is confirmed that the leakage of the gaseous fuel out of the hood is hardly occurred with the hood structure according to Patent Document 9 even in the presence of a crosswind of about 10 m/s, and also that there is no leakage of the gaseous fuel in the actual operation. However, it is becoming clear that a slight leakage of the gaseous fuel is caused with the above hood structure depending on a structure of a building installed with the sintering machine.

The invention is made in view of the aforementioned problems inherent to the conventional techniques, and an object thereof is to provide a gaseous fuel supply apparatus for a sintering machine wherein a gaseous fuel supplied from the gaseous fuel supply apparatus is not leaked to the outside irrespective of a building structure installed with a sintering machine.

Means for Solving the Problem

The inventors have made various studies for the purpose of solving the problems. As a result, it has been found that it is effective to arrange a plurality of vortex suppressing plates having a certain void in the widthwise direction above the hood of the gaseous fuel supply apparatus disclosed in Patent Document 9, and that it is preferably effective to arrange windbreak plates surrounding the lower parts of the both sides of the hood and the side walls of the pallet in order to surely prevent the leakage of the gaseous fuel supplied to the gaseous fuel supply apparatus to the outside irrespective of the building structure, and thus the invention has been accomplished.

That is, the invention is a gaseous fuel supply apparatus for a sintering machine wherein a gaseous fuel diluted to not more than the lower limit concentration of combustion is introduced into a charged layer of a sintering raw material formed on a circularly-moving pallet at a downstream of an ignition furnace in a downward suction type sintering machine to combust the gaseous fuel apart from carbonaceous material in the sintering raw material, characterized by comprising a hood having approximately the same width as the pallet and arranged above the charged layer so as to surround the pallet in all directions, gaseous fuel supply pipes disposed at an upper position of the charged layer in the hood and supplying a gaseous fuel to air in the inside of the hood, baffle plates formed by arranging plate materials having a dog-leg shaped cross section in plural rows at intervals in the widthwise direction of the hood and in plural steps at intervals at in the height direction of the hood so as to make each interval formed between the adjacent plate materials in the widthwise direction of the hood in each steps vertically alternate, fences having a void and arranged on the upper ends of the both sides of the hood and plural vortex suppressing plates formed between the fences at intervals having a void ratio of 20~80%.

The gaseous fuel supply apparatus for the sintering machine according to the invention is characterized in that windbreak plates surrounding the lower part of the hood and the side walls of the pallet are provided on the both sides of the hood.

Also, the vortex suppressing plates in the gaseous fuel supply apparatus for the sintering machine according to the invention are characterized by vertically arranging in the widthwise direction of the hood at an interval of 500~4000 mm.

Further, the vortex suppressing plate in the gaseous fuel supply apparatus for the sintering machine according to the invention is characterized to be a plate material having a width of 250~4000 mm.

Effect of the Invention

According to the invention, the leakage of the gaseous fuel supplied from the gaseous fuel supply apparatus out of the apparatus due to a crosswind can be surely prevented without being affected by the building structure, so that a high-quality sintered ore can be manufactured safely and stably.

EMBODIMENTS FOR CARRYING OUT THE INVENTION

An embodiment of the invention will be described below.

A sintering machine aiming at the application of the invention is a downward suction type sintering machine, and uses a gaseous fuel supplied at a downstream side of an ignition furnace as a heat source in the sintering of a sintering raw material in addition to carbonaceous material such as coke breeze or the like added to the sintering raw material. The gaseous fuel is supplied from a gaseous fuel supply apparatus arranged above a charged layer and combusted at a position different from the carbonaceous material, whereby it is made possible to prolong a time kept at a temperature of not lower than 1200° C. (high-temperature zone retention time) without exceeding a highest achieving temperature during sintering over 1400° C.

Figure 1:
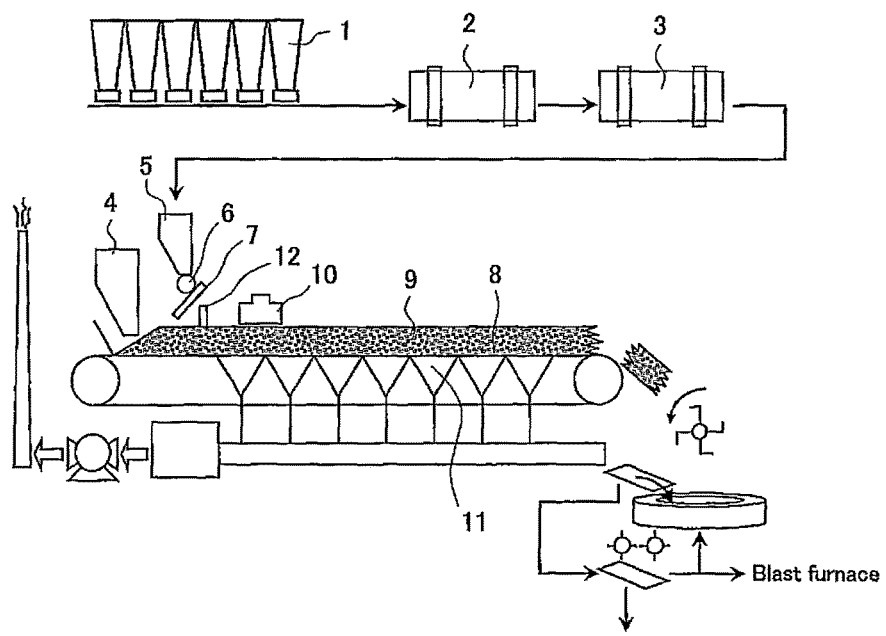
FIG. 1 is a schematic view illustrating a sintering process.
Figure 2:
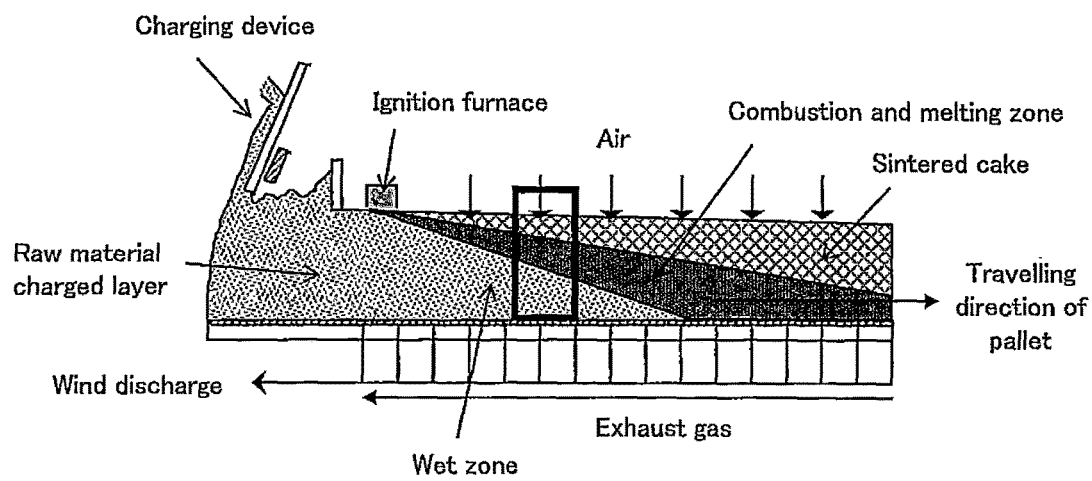
FIG. 2 is a schematic view illustrating a change inside a charged layer with the advance of the sintering progress.
Figure 3:
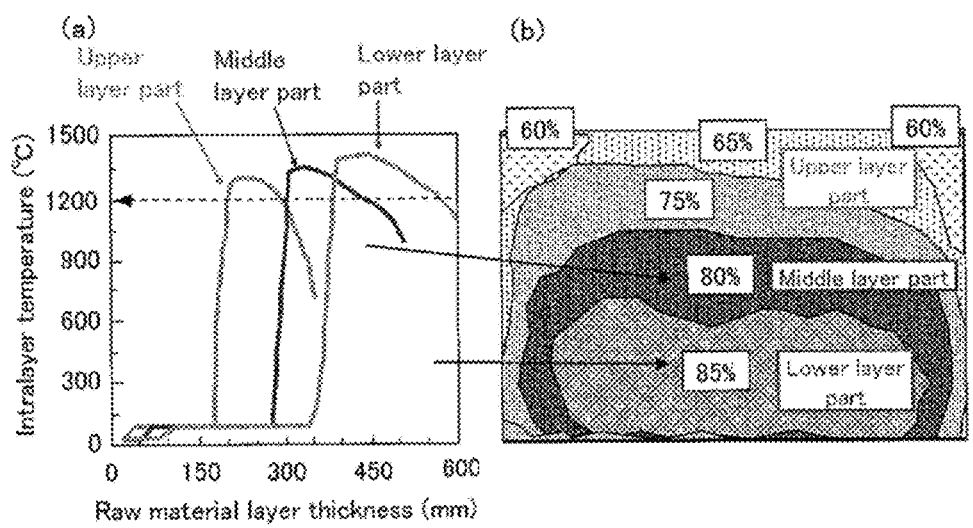
FIG. 3 is a view illustrating a temperature distribution when a combustion zone is existent in each position of an upper part, middle part and lower part of the charged layer and a yield distribution of a sintered ore in the widthwise section of the charged layer.
Figure 4:
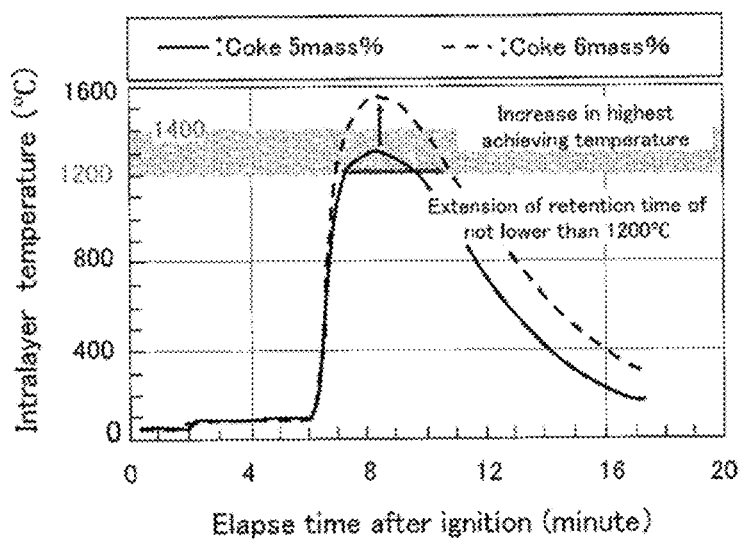
FIG. 4 is a view illustrating a temperature change in a charged layer by varying an amount of a carbonaceous material (increase of amount).
Figure 5:
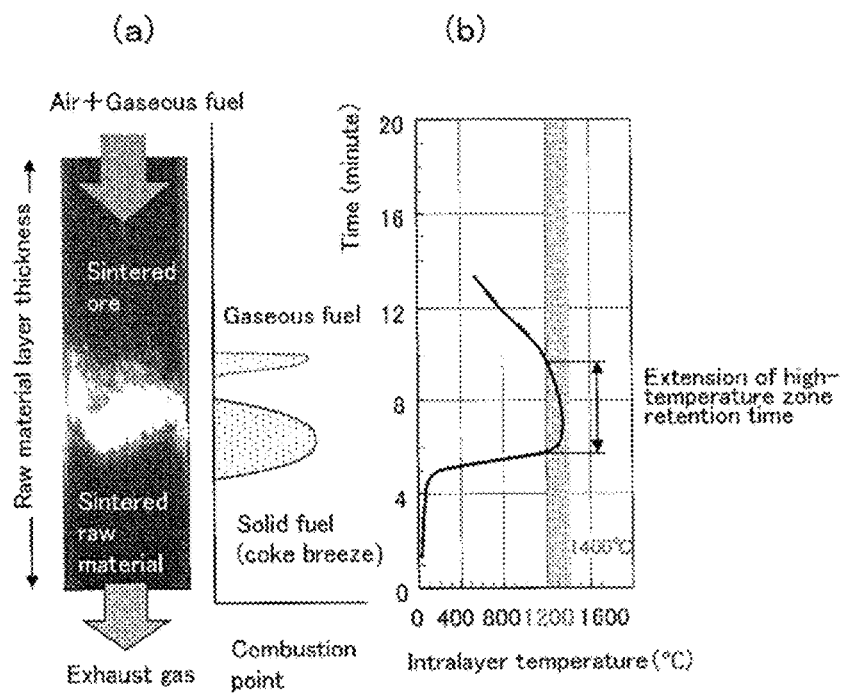
FIG. 5 is a view illustrating a change in a temperature distribution inside a charged layer by supply of a gaseous fuel.
Figure 6:
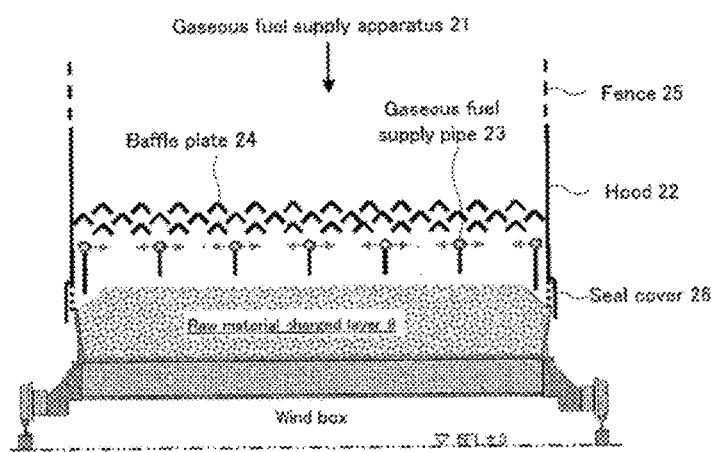
FIG. 6 is a schematic view of the gaseous fuel supply apparatus disclosed in Patent Document 9.

The gaseous fuel is diluted to not more than the lower limit concentration of combustion in the gaseous fuel supply apparatus or supplied from the gaseous fuel supply apparatus at a state of being previously diluted to not more than the lower limit concentration of combustion, so that when the gaseous fuel is leaked out of the hood of the gaseous fuel supply apparatus shown, for example, in FIG. 6, there is no risk of causing a fire or an explosion. However, the leakage of the gaseous fuel not only deteriorates an effect of adding the gaseous fuel, but also has a safety problem when a gaseous fuel containing harmful carbon monoxide such as B gas or the like is used. Therefore, it is required to surely prevent the leakage of the gaseous fuel out of the gaseous fuel supply apparatus.

Figure 7:
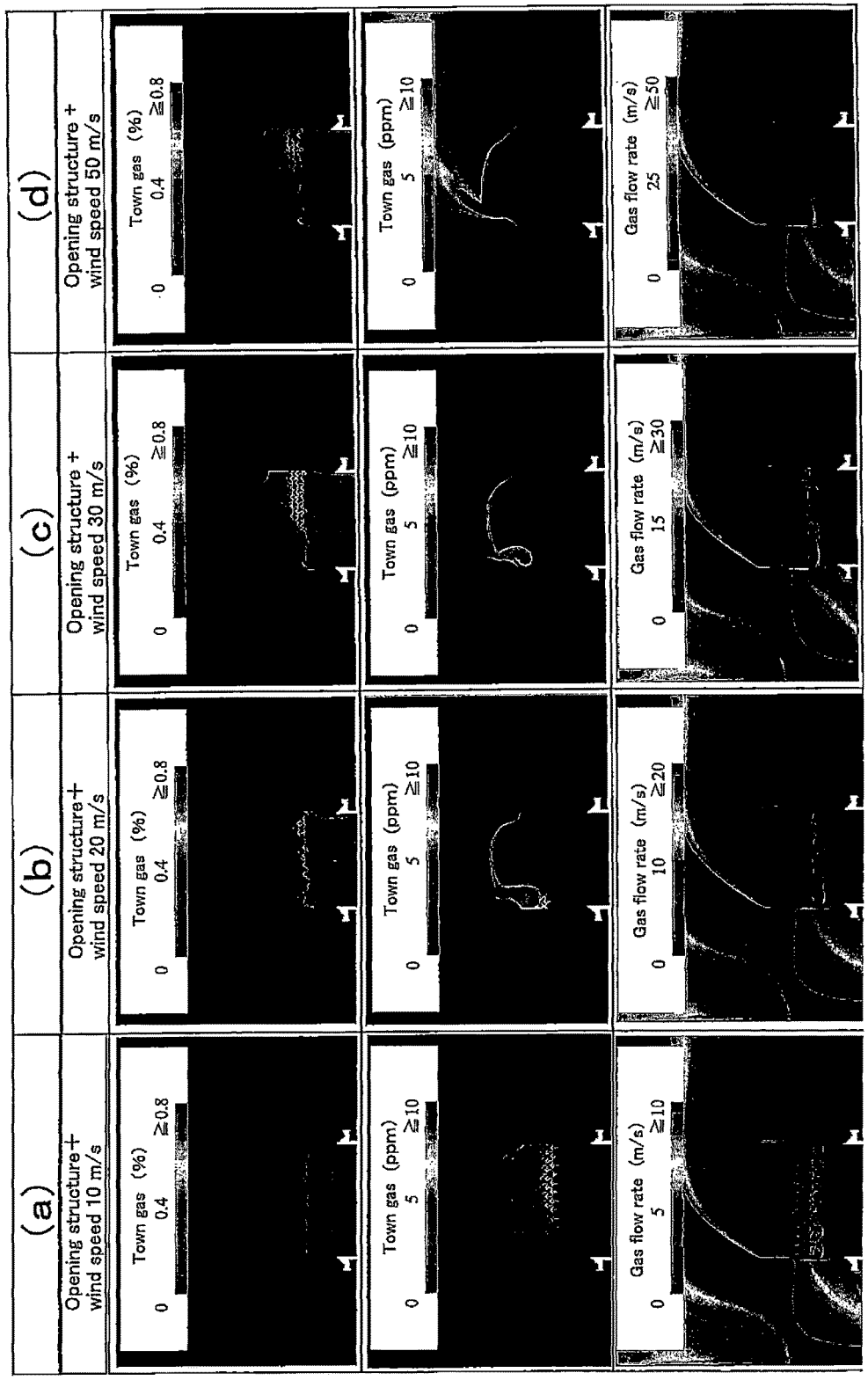
FIG. 7 is a view showing simulation results on a leakage of a gaseous fuel in a sintering machine disposed in a building with an opening structure.
Figure 8:
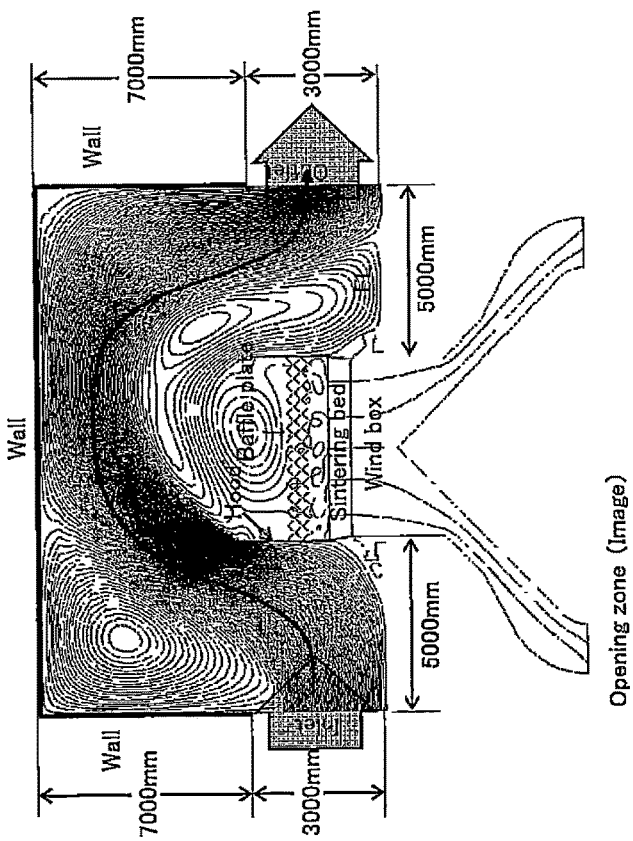
FIG. 8 is a view illustrating a building structure used in simulating leakage of a gaseous fuel from a gaseous fuel supply apparatus arranged in a sintering machine.
Figure 8:
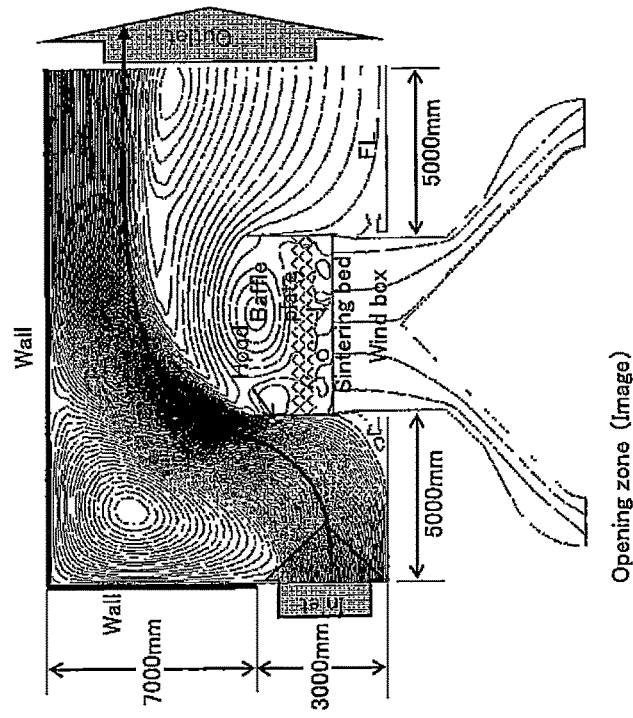
Figure 9:
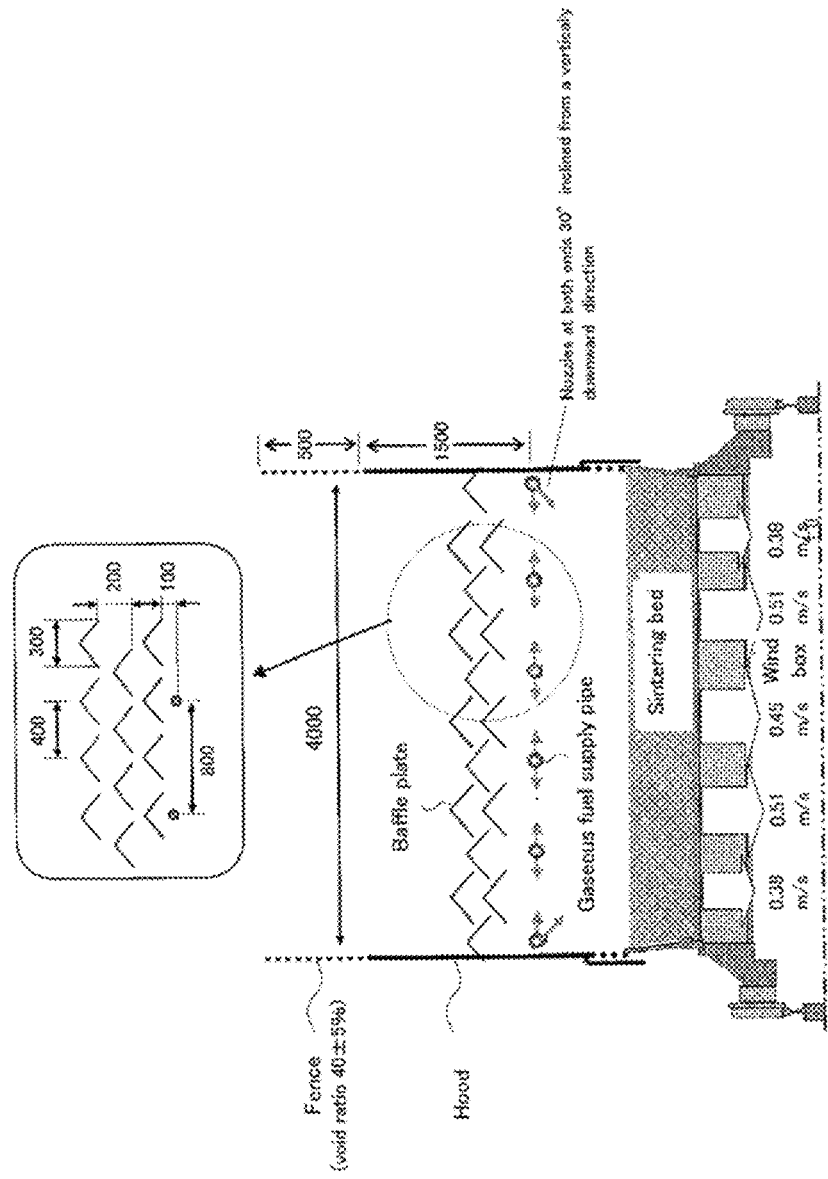
FIG. 9 is a view illustrating a specification of a sintering machine used for the simulations.

FIG. 7 shows simulation results of conditions that a gaseous fuel (town gas) supplied from the gaseous fuel supply apparatus is dispersed out of the hood at a wind speed of 10 m/s, 20 m/s, 30 m/s or 50 m/s when a crosswind is applied from the lateral direction to a sintering machine installed in a building with such a structure that a lower part of a lateral wall on the windward side is opened and lateral wall is not existent on the leeward side or the whole surface is at an opened state (hereinafter referred to as "an opening structure") as shown in FIG. 8(a). The sintering machine shown in the figure has a pallet of 4000 mm in width and is constructed with a gaseous fuel supply apparatus comprising a hood of 1500 mm in height arranged above the pallet and provided at its upper end with a fence having a void ratio of 40%, baffle plates having a dog-leg shaped cross section and a width of 300 mm disposed in a middle part inside the hood in a triple configuration at a pitch of 400 mm in a widthwise direction and at a pitch of 200 mm in a height direction, and 6 pipe nozzles for supplying town gas disposed beneath the baffle plates at a pitch of 800 mm in a widthwise direction. Also, a distribution of gas amount sucked by wind boxes (wind boxes) in the widthwise direction of the pallet is set as shown in FIG. 9.

As seen from FIG. 7, when the building installed with the sintering machine is an opening structure, the town gas is hardly leaked out of the hood up to a wind speed of 30 m/s and the leakage of the gaseous fuel finally starts at a wind speed of 50 m/s. Generally, the wind speed does not reach 50 m/s in the building, so that it is considered that the leakage of the town gas is not caused in the building with an opening structure.

Figure 10:
FIG. 10 is a view showing simulation results on a leakage of a gaseous fuel in a sintering machine disposed in a building with an open ceiling structure.

On the other hand, FIG. 10 shows simulation results of conditions that a town gas supplied from the gaseous fuel supply apparatus is dispersed out of the hood at a wind speed of 10 m/s when a crosswind is applied from the lateral direction to a sintering machine installed in a building with such a structure that upper portions of lateral walls on windward side and leeward side are closed and lower portions thereof are opened (hereinafter referred to as "open ceiling structure") as shown in FIG. 8(b) as compared to the results in the case of the opening structure shown in FIG. 7 at wind speeds of 10 m/s, 20 m/s and 50 m/s. As seen from this figure, when the building has an open ceiling structure, the leakage of the town gas exceeding the leakage in the case of the opening structure at a wind speed of 50 m/s is caused even at a wind speed of 10 m/s.

That is, when the building has an opening structure as shown in FIG. 8(a), the leakage of the gaseous fuel does not become a problem, while when it has an open ceiling structure as shown in FIG. 8(b), there is a risk of causing the leakage of the gaseous fuel. The reason of causing the leakage of the gaseous fuel is considered due to the fact that as seen from a flow rate distribution of a gas shown in the lowermost part of FIG. 10, any large vortex is not observed in a gas flow inside the hood in the building with an opening structure even at a wind speed of 50 m/s, while a large vortex is already generated inside the hood in the building with an open ceiling structure at a wind speed of 10 m/s.

The inventors have made various studies on a hood structure for suppressing the formation of vortex inside the hood causing the leakage of the gaseous fuel. As a result, it has been found that it is effective to vertically arrange a plurality of vortex suppressing plates 27 having an air permeability above the hood 22 in the gaseous fuel supply apparatus as shown in FIG. 11(a).

Figure 11:
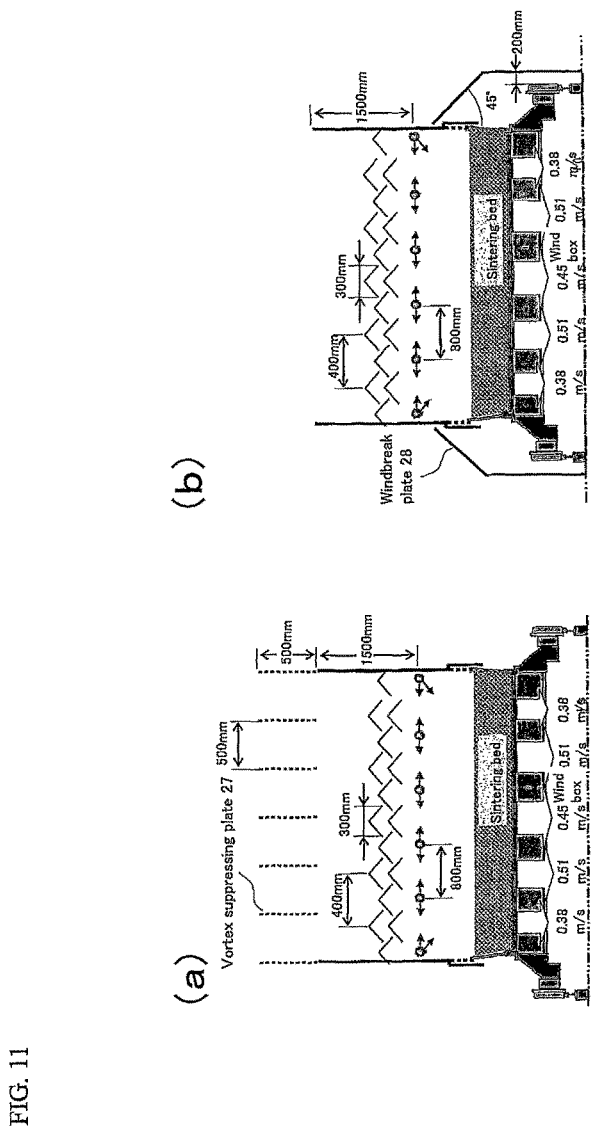
FIG. 11 is a view illustrating vortex suppressing plates and windbreak plates for preventing a leakage of a gaseous fuel.
Figure 12:
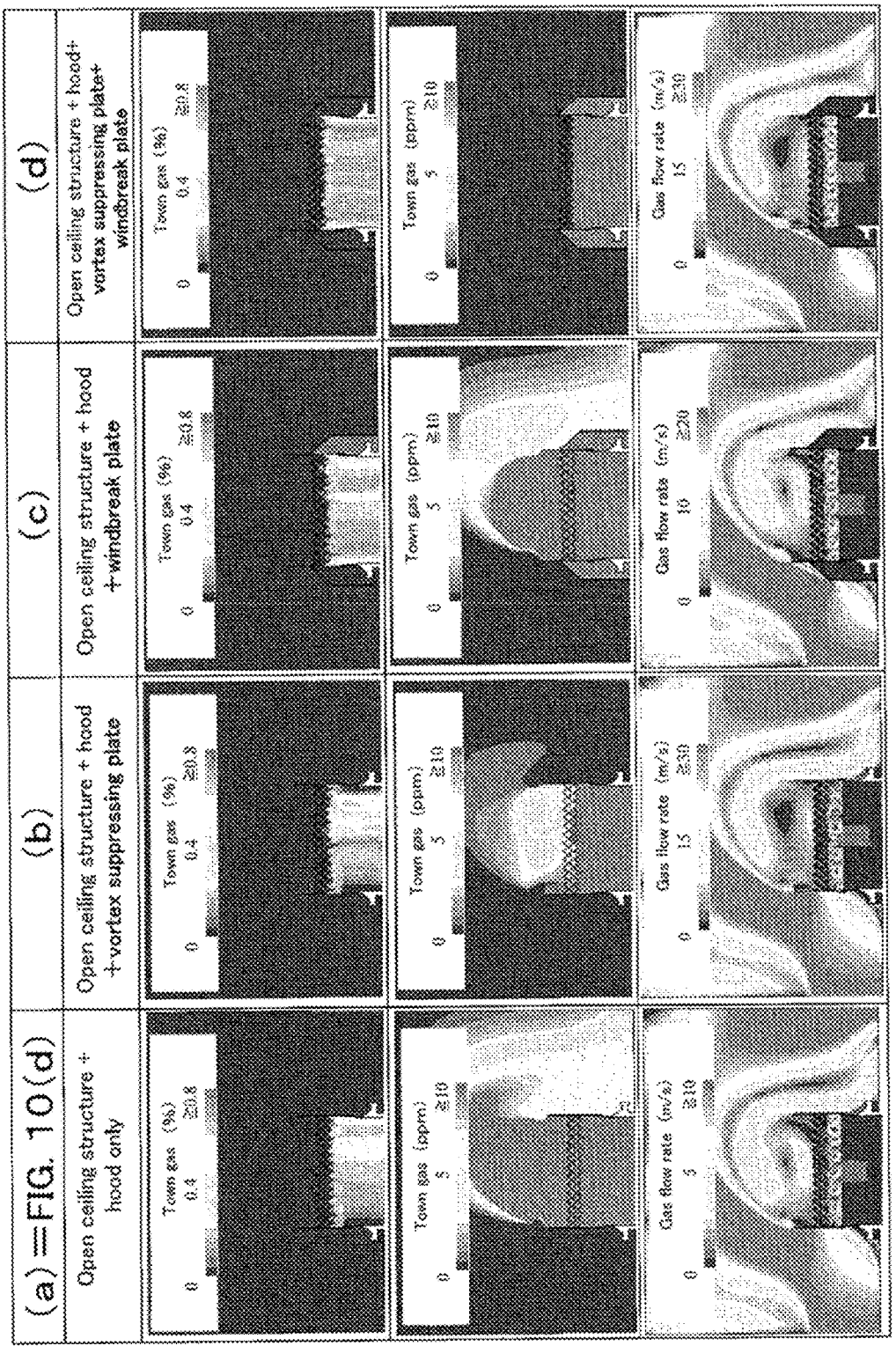
FIG. 12 is a view showing simulation results on a suppressing effect of vortex suppressing plates and windbreak plates to a leakage of a gaseous fuel.

FIG. 12(b) shows simulation results on the leakage of the gaseous fuel when a crosswind is applied at a wind speed of 10 m/s to a sintering machine arranged in a building with an open ceiling structure wherein a plurality of vortex suppressing plates 27 shown in FIG. 11(a) are vertically arranged in an upper part of the hood of the gaseous fuel sintering apparatus as compared to the aforementioned simulation results (FIG. 10(d)) of the open ceiling structure when a crosswind is applied at a wind speed of 10 m/s. As seen from the two figures, the leakage of the gaseous fuel can be considerably decreased by disposing the vortex suppressing plates 27 even in the open ceiling structure.

The inventors consider the reason why the leakage of the gaseous fuel is prevented by disposing the vortex suppressing plates as follows.

Figure 13:
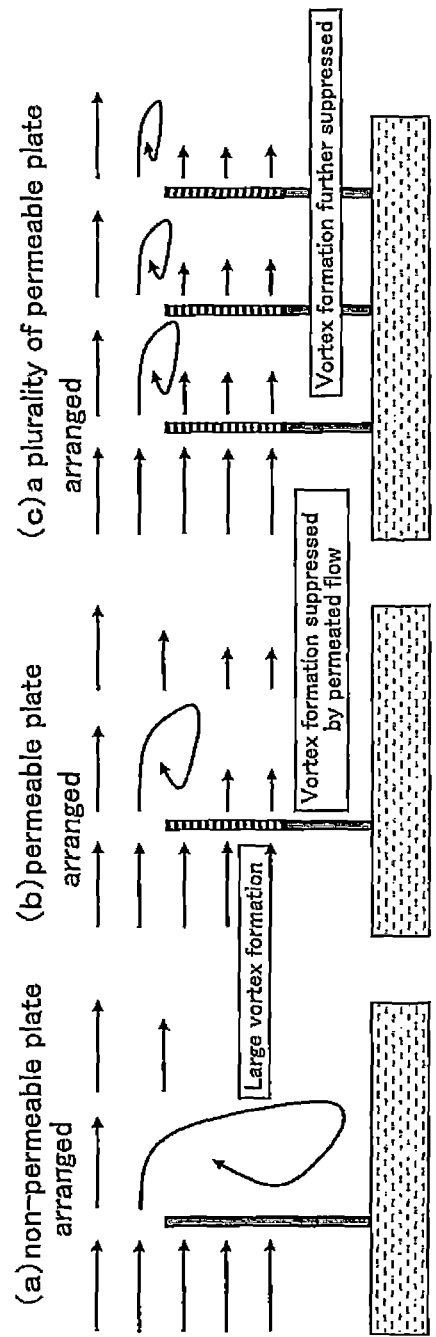
FIG. 13 is a view illustrating an effect of suppressing a leakage of a gaseous fuel by vortex suppressing plates.

For example, when a crosswind is applied to a single standing plate with no air permeability as shown in FIG. 13(a), a large vortex going around below the standing plate is formed at the downstream side (back face side) of the standing plate and hence air in the back face side of the standing plate is disturbed over a wide range by the crosswind. Assuming that the standing plate is arranged in the upper part of the hood in the gaseous fuel supply apparatus according to the invention, it is shown that when the crosswind is applied, there is a fear that air inside the hood is substantially disturbed to cause the leakage of the gaseous fuel supplied in the hood. Moreover, when the void ratio of the standing plate is large and air is almost permeated, the result is similar to that in the case of using no standing plate.

Whereas, when a crosswind is applied to a standing plate having an adequate void (having air permeability) as shown in FIG. 13(b), a small air flow is generated in the back face side of the standing plate through void portions, so that the formation of vortex is suppressed in the back face side of the standing plate. Further, in the case of arranging plural standing plates with an adequate void (with air permeability) as shown in FIG. 13(c), the formation of vortex is more suppressed in the back face side and the influence of the crosswind is considerably reduced. That is, it is possible to minimize the formation of the vortex and almost surely prevent the leakage of the gaseous fuel due to the crosswind by arranging plural standing plates with an adequate air permeability in the upper part of the hood of the gaseous fuel supply apparatus.

Figure 14:
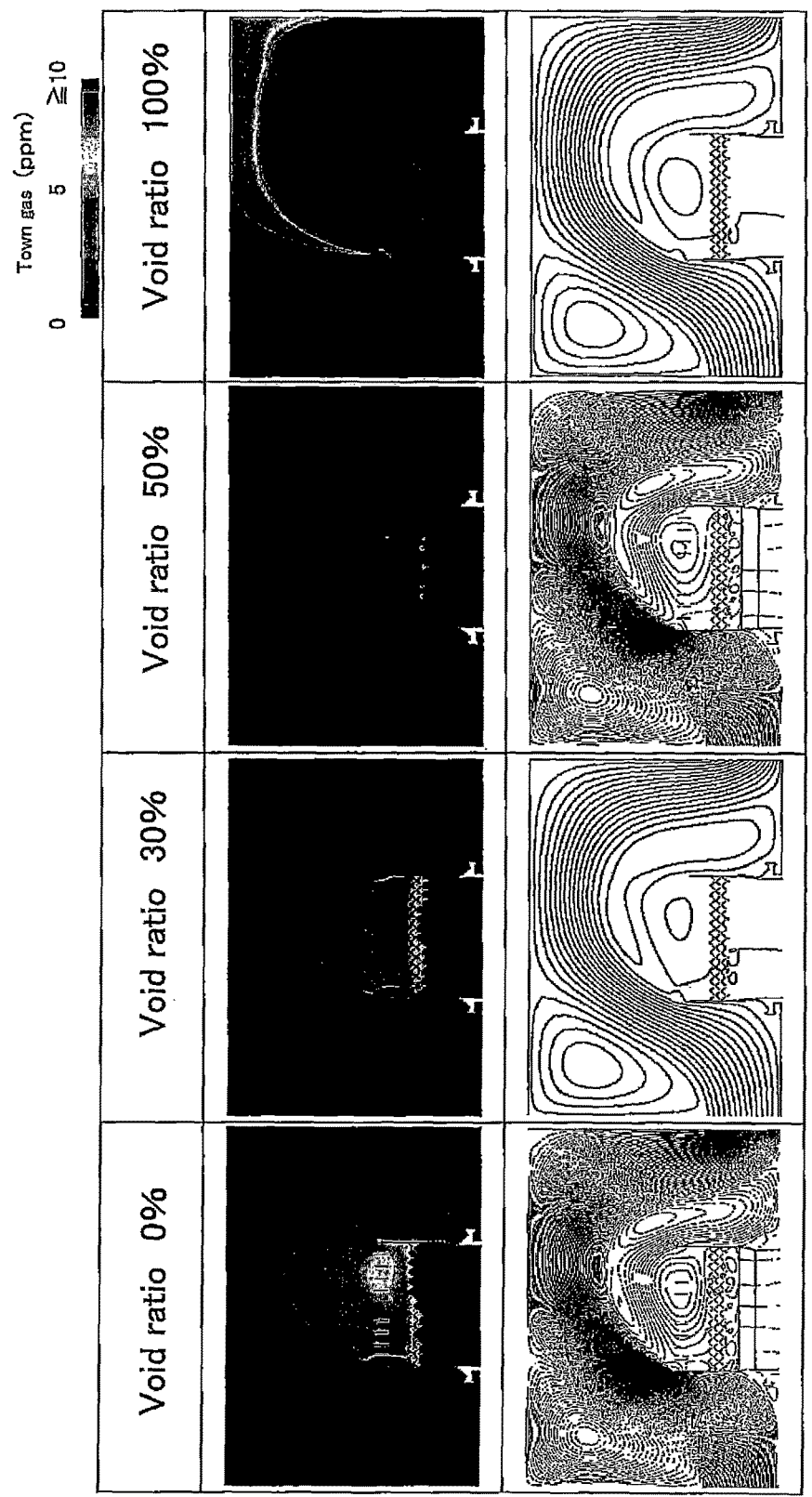
FIG. 14 is a view showing simulation results on an influence of a void ratio in a vortex suppressing plate upon a leakage of a gaseous fuel.

The vortex suppressing plate is preferable to have a void ratio of 20~80%. FIG. 14 shows simulation results on the leakage of the gaseous fuel when the void ratio of the vortex suppressing plate is varied in a range of 0%~100%, from which it can be seen that the amount of leakage is decreased within the above void ratio range. Preferably, it is in a range of 30~50%.

Figure 15:
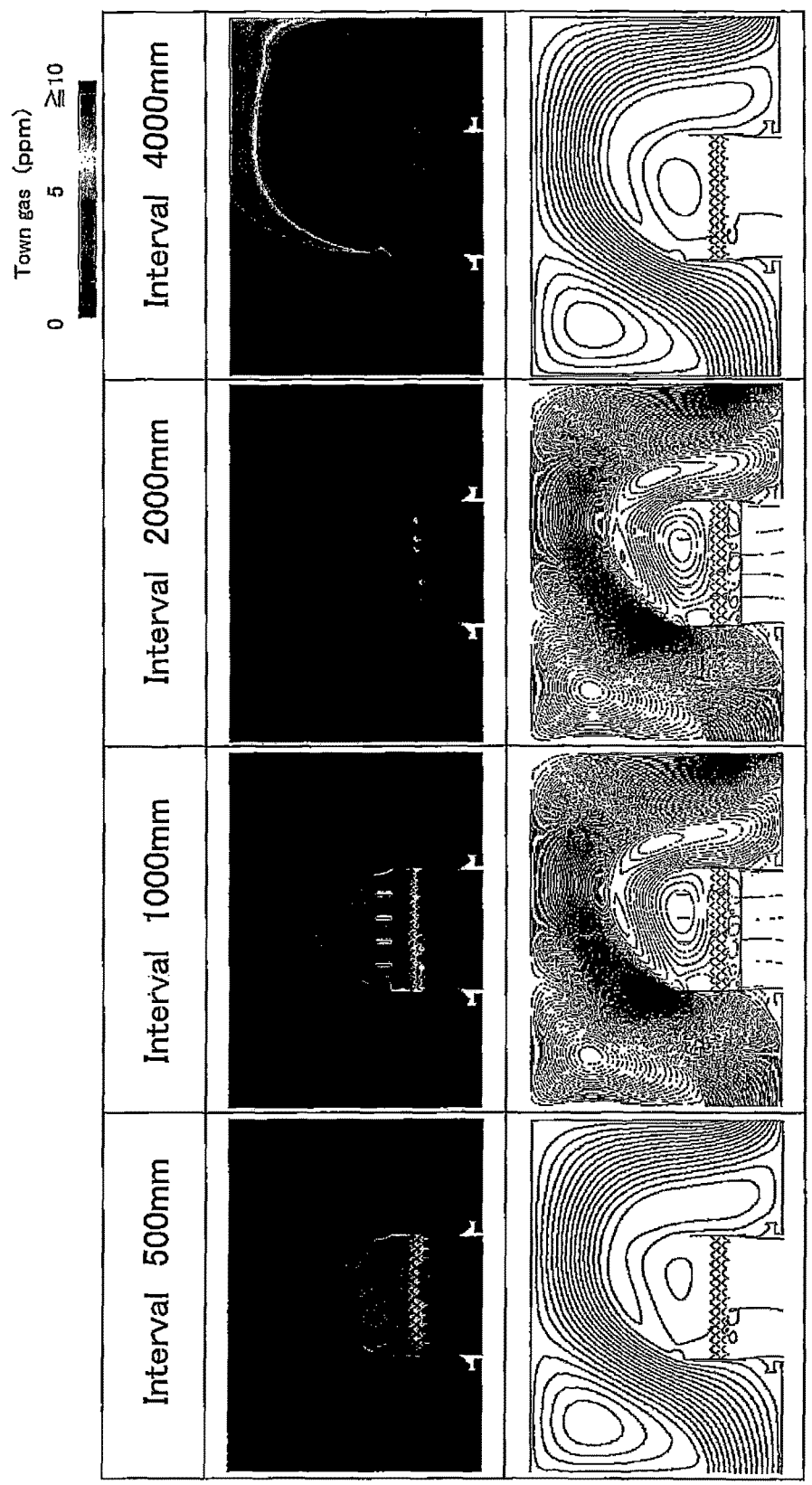
FIG. 15 is a view showing simulation results on an influence of an installation interval between vortex suppressing plates upon a leakage of a gaseous fuel.

Also, it is preferable that the vortex suppressing plates are vertically arranged at an interval of 500~4000 mm in the widthwise direction of the hood. FIG. 15 shows simulation results on the leakage of the gaseous fuel when the interval of the vortex suppressing plates is varied in a range of 500~4000 mm, from which it can be seen that the amount of leakage is decreased in the above interval range. More preferably, it is in a range of 1000~2000 mm.

Figure 16:
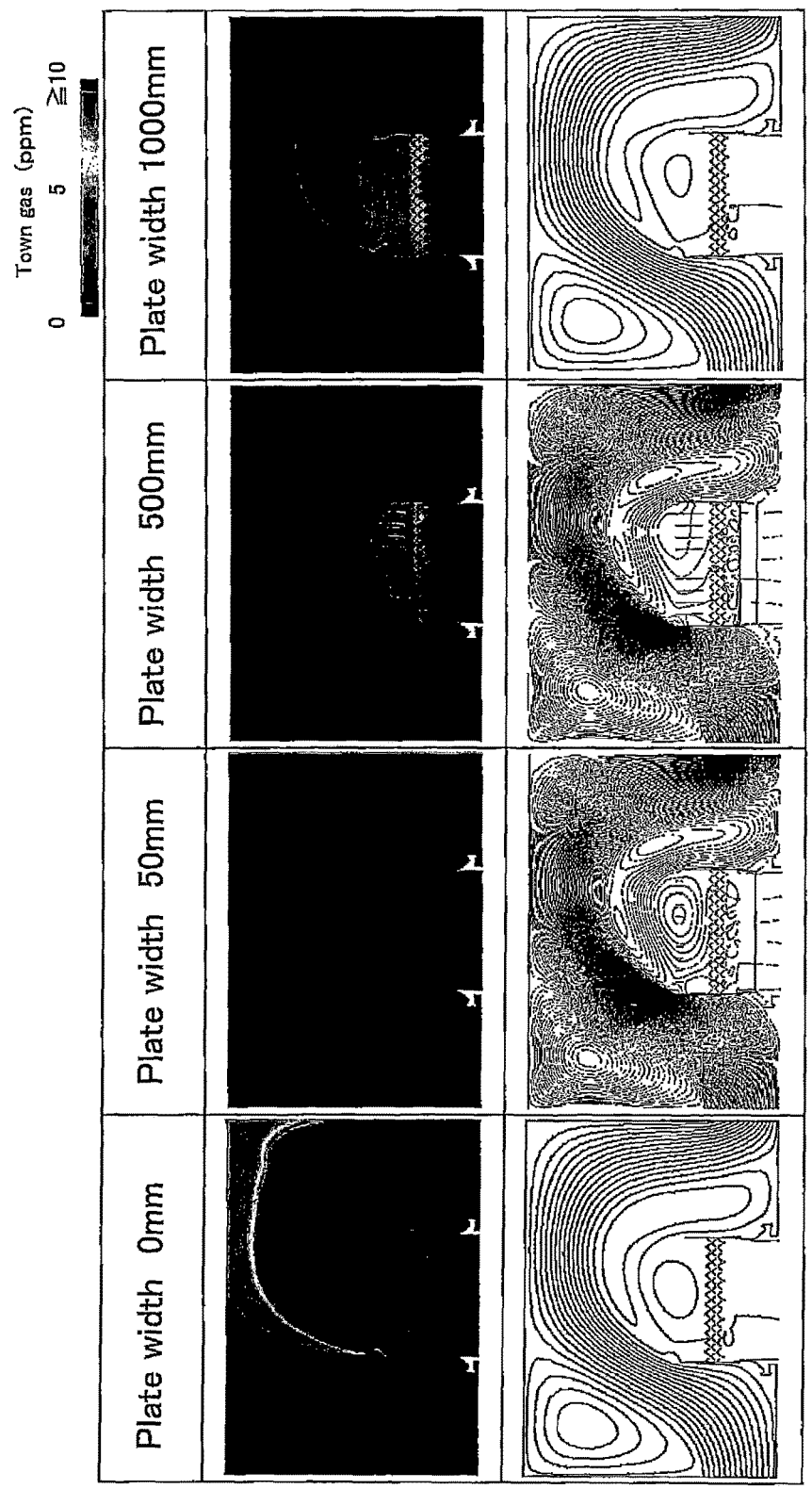
FIG. 16 is a view showing simulation results on an influence of a width (height) of a vortex suppressing plate upon a leakage of a gaseous fuel.

Further, it is preferable that each plate material of the vortex suppressing plates has a width (height) of 250~1000 mm. FIG. 16 shows simulation results on the leakage of the gaseous fuel when the width of the vortex suppressing plate is varied in a range of 0~1000 mm, from which it can be seen that the amount of leakage is decreased within the above width range. More preferably, it is in a range of 250~500 mm.

The inventors have made further studies on a hood structure capable of more surely preventing the leakage of the gaseous fuel. As a result, it has been found that it is effective to dispose windbreak plates 28 surrounding the lower part of the hood and the side wall of the pallet 8 at both lower side parts of the hood 22 as shown in FIG. 11(b) instead of seal covers 26 locally arranged in the lower part of the hood as disclosed in Patent Document 9 or in addition to the seal covers 26.

FIG. 12(c) and FIG. 12(d) show simulation results on the leakage of the gaseous fuel when a crosswind is applied at a wind speed of 10 m/s in the case of arranging the windbreak plates 28 shown in FIG. 11(b) in the lower part of the hood of the gaseous fuel supply apparatus in the sintering machine installed in the building with an open ceiling structure and in the case of arranging both the vortex suppressing plates 27 shown in FIG. 11(a) and the windbreak plates 28 therein, respectively. From comparison of these figures with FIGS. 12(a) and 12(b), it can be seen that the leakage of the gaseous fuel can be somewhat decreased by arranging the windbreak plates 28 even in the open ceiling structure and that the leakage of the gaseous fuel can be almost entirely prevented even in the open ceiling structure by arranging the windbreak plates 28 in combination with the vortex suppressing plates 27.

EXAMPLE

Figure 17:
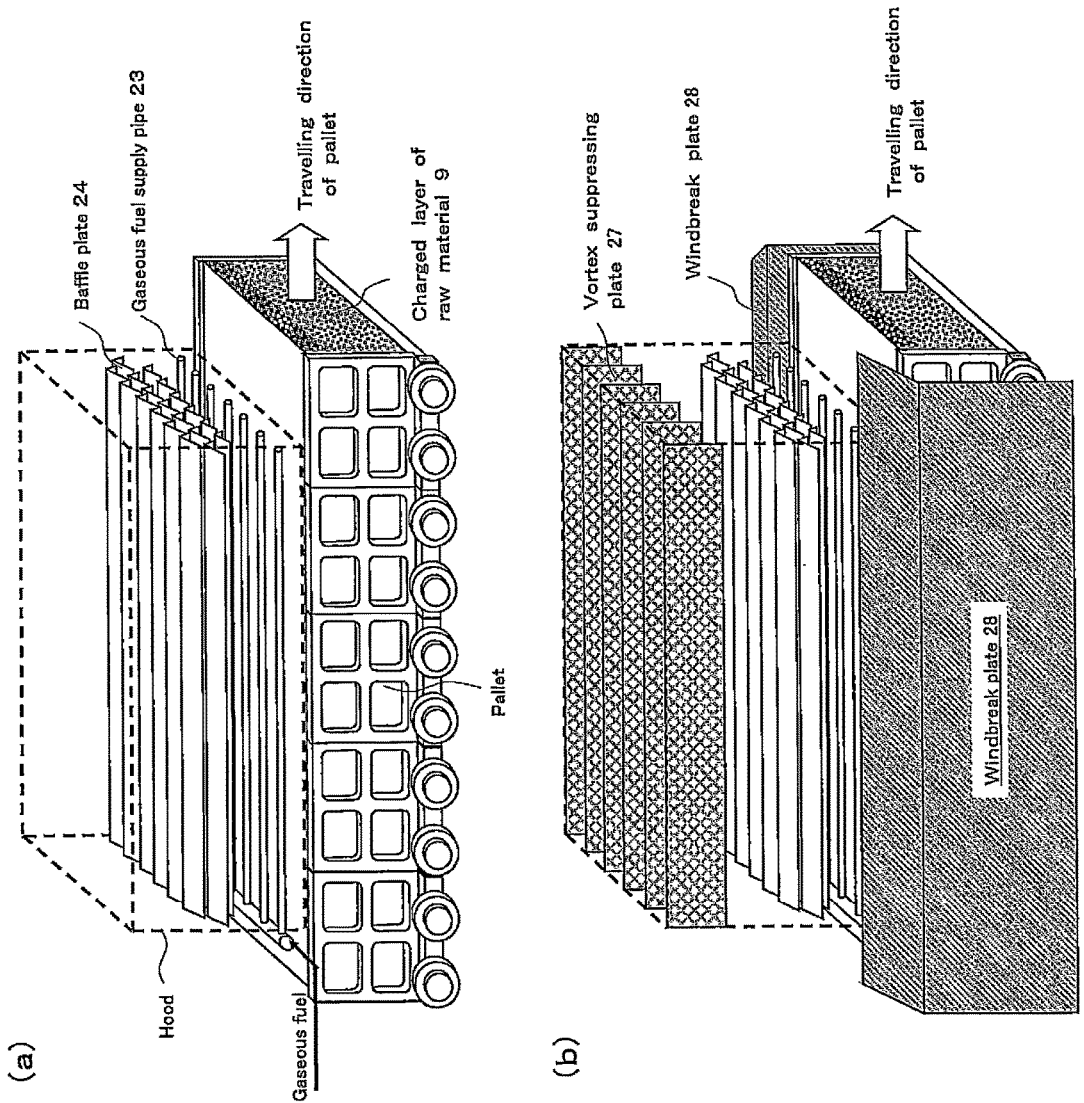
FIG. 17 is a view illustrating a gaseous fuel supply apparatus used in examples.

A sintering operation supplying a gaseous fuel is conducted by arranging three gaseous fuel supply apparatuses having a hood of 4500 mm in width and 7500 mm in length as shown in FIG. 17(a) in series at a downstream side of an ignition furnace in an actual sintering machine having a pallet width of 4500 mm, an effective machine length of 82 m and a production volume of 360000 t/month. The sintering machine is installed in a building with an open ceiling structure in the invention. In the sintering operation, anemometers are disposed outside the building and on the machine side of the sintering machine and a detecting device of a gaseous fuel (methane) is disposed on the machine side of the gaseous fuel supply apparatus. The supply of the gaseous fuel is urgently stopped when the leakage of the gaseous fuel of not less than 50 mass ppm is detected.

The sintering operation is conducted under the above condition, and the number of causing the leakage of the gaseous fuel over the above standard is measured in a time zone when the wind speed outside the building is more than 20 m/s, and as a result, the frequency is 2 times/hour.

Next, the sintering operation is conducted by arranging vortex suppressing plates shown in FIG. 11 in the upper part of the hood of the gaseous fuel supply apparatus and the windbreak plates in the lower part of the hood as shown in FIG. 17(b) and the same measurement as mention above is performed, and as a result, the number of leakages of the gaseous fuel exceeding 50 mass ppm can be made zero.

INDUSTRIAL APPLICABILITY

The technique according to the invention is applicable to the control of building wind in the fields of civil engineering and architecture or the like.

DESCRIPTION OF REFERENCE SYMBOLS

| | |
|---|---|
| 1: hopper for raw material | 2: drum mixer |
| 3: rotary kiln | 4, 5: surge hopper |
| 6: drum feeder | 7: cutout chute |
| 8: pallet | 9: raw material charged layer (sintering bed) |
| 10: ignition furnace | 11: wind box (wind box) |
| 12: cutoff plate | 21: gaseous fuel supply apparatus |
| 22: hood | 23: gaseous fuel supply pipe |
| 24: baffle plate | 25: fence |
| 26: seal in lower part of hood | 27: vortex suppressing plate |
| 28: windbreak plate | |

The invention claimed is:

1. A gaseous fuel supply apparatus for a sintering machine wherein a gaseous fuel diluted to not more than the lower limit concentration of combustion is introduced into a charged layer of a sintering raw material formed on a circularly-moving pallet at a downstream of an ignition furnace in a downward suction type sintering machine to combust the gaseous fuel apart from carbonaceous material in the sintering raw material, characterized by comprising a hood having approximately the same width as the pallet and arranged above the charged layer so as to surround the pallet in all directions, gaseous fuel supply pipes disposed at an upper position of the charged layer in the hood and supplying a gaseous fuel to air in the inside of the hood, baffle plates formed by arranging plate materials having a dog-leg shaped cross section in plural rows at intervals in the widthwise direction of the hood and in plural steps at intervals in the height direction of the hood so as to make each interval formed between the adjacent plate materials in the widthwise direction of the hood in each steps vertically alternate, fences having a void and arranged on the upper ends of the both sides of the hood, and vortex suppressing plates having a void ratio of 20~80% formed between the fences at intervals and disposed above upper ends of the baffle plates.

2. The gaseous fuel supply apparatus according to claim 1, wherein the vortex suppressing plate is a plate material having a width of 250~1000 mm.

3. The gaseous fuel supply apparatus according to claim 1, wherein the vortex suppressing plates are vertically arranged at an interval of 500~4000 mm in the widthwise direction of the hood.

4. The gaseous fuel supply apparatus according to claim 3, wherein the vortex suppressing plate is a plate material having a width of 250~1000 mm.

5. The gaseous fuel supply apparatus according to claim 1, wherein windbreak plates surrounding a lower part of the hood and a side wall of the pallet are arranged on the both sides of the hood.

6. The gaseous fuel supply apparatus according to claim 5, wherein the vortex suppressing plate is a plate material having a width of 250~1000 mm.

7. The gaseous fuel supply apparatus according to claim 5, wherein the vortex suppressing plates are vertically arranged at an interval of 500~4000 mm in the widthwise direction of the hood.

8. The gaseous fuel supply apparatus according to claim 7, wherein the vortex suppressing plate is a plate material having a width of 250~1000 mm.

* * * * *